(12) United States Patent
Kometani et al.

(10) Patent No.: US 12,500,498 B2
(45) Date of Patent: Dec. 16, 2025

(54) ROTARY ELECTRIC MACHINE

(71) Applicant: Mitsubishi Electric Corporation, Tokyo (JP)

(72) Inventors: Haruyuki Kometani, Tokyo (JP); Ryoji Miyatake, Tokyo (JP); Takuro Yamada, Tokyo (JP); Kenji Tanaka, Tokyo (JP); Yuji Takizawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 786 days.

(21) Appl. No.: 17/785,908

(22) PCT Filed: Apr. 16, 2020

(86) PCT No.: PCT/JP2020/016671
§ 371 (c)(1),
(2) Date: Jun. 16, 2022

(87) PCT Pub. No.: WO2021/210118
PCT Pub. Date: Oct. 21, 2021

(65) Prior Publication Data
US 2023/0025203 A1     Jan. 26, 2023

(51) Int. Cl.
*H02K 16/02*     (2006.01)

(52) U.S. Cl.
CPC ......... *H02K 16/02* (2013.01); *H02K 2201/03* (2013.01); *H02K 2209/00* (2013.01)

(58) Field of Classification Search
CPC ............... H02K 16/02; H02K 2201/03; H02K 2209/00; H02K 1/14; H02K 1/17;
(Continued)

(56) References Cited

U.S. PATENT DOCUMENTS

| | | | |
|---|---|---|---|
| 2012/0194021 A1 | 8/2012 | Nakatsugawa et al. | |
| 2013/0119789 A1* | 5/2013 | Maekawa | H02K 21/12 310/46 |
| 2022/0200396 A1* | 6/2022 | Wang | H02K 7/1838 |

FOREIGN PATENT DOCUMENTS

| | | | |
|---|---|---|---|
| JP | 5286373 B2 | | 9/2013 |
| JP | 2016135014 A | * | 7/2016 |
| JP | 6403329 B2 | | 10/2018 |

OTHER PUBLICATIONS

Machine translation of JP-2016135014-A. Retrieved from https://worldwide.espacenet.com/patent/search/family/056464698/publication/JP2016135014A?q=JP2016135014 (Year: 2016).*

(Continued)

*Primary Examiner* — Christopher M Koehler
*Assistant Examiner* — Riley Owen Stout
(74) *Attorney, Agent, or Firm* — XSENSUS LLP

(57) ABSTRACT

Increase in weight of a rotary electric machine including a low-speed rotor in which a spacer made of metal is provided between a plurality of magnetic pole pieces, can be suppressed. The rotary electric machine includes a stator, a first rotor provided so as to be rotatable with respect to the stator, and a second rotor provided coaxially with the first rotor. The first rotor includes a plurality of magnetic pole pieces disposed so as to be arranged in the circumferential direction, a plurality of spacers respectively disposed between the plurality of magnetic pole pieces, two dampers respectively disposed at both end portions in the axial direction, and a fastening tool for fastening each spacer to a corresponding clamper. The spacer has a cavity portion. The spacer and the fastening tool are electrically insulated from each other.

13 Claims, 7 Drawing Sheets

(58) Field of Classification Search
CPC .......... H02K 1/246; H02K 1/278; H02K 1/32; H02K 7/183; Y02E 10/72
See application file for complete search history.

(56) References Cited

OTHER PUBLICATIONS

International Search Report and Written Opinion mailed on Jun. 23, 2020, received for PCT Application PCT/JP2020/016671, filed on Apr. 16, 2020, 9 pages including English Translation.

* cited by examiner

ROTARY ELECTRIC MACHINE

CROSS-REFERENCE TO RELATED APPLICATION

The present application is based on PCT filing PCT/JP2020/016671, filed Apr. 16, 2020, the entire contents of which is incorporated herein by reference.

TECHNICAL FIELD

The present disclosure relates to a rotary electric machine.

BACKGROUND ART

As an electric generator for a wind power generation device, a magnetic-geared electric generator obtained by integrating a magnetic speed reducer and an electric generator can be used. The magnetic-geared electric generator is composed of a low-speed rotor, a high-speed rotor provided coaxially with the low-speed rotor, and a stator including a stator coil and a permanent magnet. When the magnetic-geared electric generator is used as an electric generator for a wind power generation device, the low-speed rotor is rotated in conjunction with a wind mill, the high-speed rotor is rotated at a high speed according to a magnetic gear effect due to rotation of the low-speed rotor, and accordingly, induced power is generated in the stator coil, whereby power generation is performed.

In the low-speed rotor, a plurality of magnetic pole pieces are disposed in the circumferential direction. One magnetic pole piece is composed of a plurality of thin-plate-shaped electromagnetic steel sheets stacked in the axial direction. As a method for fixing the magnetic pole pieces in the axial direction, a method in which nonmagnetic bars are disposed between the plurality of magnetic pole pieces in the circumferential direction, and end plates made of metal are provided at both ends in the axial direction, has been disclosed. The end plates at both ends are fastened in the axial direction by the nonmagnetic bars, whereby the magnetic pole pieces are fixed in the axial direction. The magnetic pole pieces and the nonmagnetic bars are integrated with each other with a resin mold (see Patent Document 1, for example).

CITATION LIST

Patent Document

Patent Document 1: Japanese Patent No. 5286373

SUMMARY OF THE INVENTION

Problems to be Solved by the Invention

However, in a rotary electric machine such as a magnetic-geared electric generator having a diameter of several meters, or a magnetic-geared electric generator having a large number of magnetic pole pieces, a strong force such as a stress due to its own weight, a centrifugal force, and an electromagnetic force acts on the low-speed rotor. A low-speed rotor obtained simply by integrating the magnetic pole pieces and the nonmagnetic bars with a resin mold may be deformed due to such strong forces. When the low-speed rotor is deformed, the gap between the low-speed rotor and the high-speed rotor and the stator becomes uneven, whereby problems such as decrease of efficiency and increase in electromagnetic noise are caused. In order to suppress deformation of the low-speed rotor, a method in which the space between the plurality of magnetic pole pieces is filled with a metal member is conceivable. However, when the space between the plurality of magnetic pole pieces is filled with a metal member, there is a problem in which the weight of the low-speed rotor is increased and the support structure of the rotary electric machine is increased in size.

The present disclosure has been made in order to solve the problems as described above. In a low-speed rotor in which a spacer made of metal is provided between a plurality of magnetic pole pieces, increase in weight of the low-speed rotor can be suppressed.

Solution to the Problems

A rotary electric machine of the present disclosure includes: a stator including a stator coil and a stator permanent magnet; a first rotor provided so as to be rotatable with respect to the stator, with a first gap from the stator; and a second rotor provided coaxially with the first rotor, with a second gap from the first rotor, the second rotor including a plurality of rotor permanent magnets disposed so as to be arranged in a circumferential direction. The first rotor includes: a plurality of magnetic pole pieces disposed so as to be arranged in the circumferential direction; a plurality of spacers made of nonmagnetic metal and respectively disposed between the plurality of magnetic pole pieces; two clampers respectively disposed at both end portions in an axial direction; and a fastening tool for fastening each spacer to a corresponding one of the clampers. The spacer has a cavity portion. The spacer and the fastening tool are electrically insulated from each other.

Effect of the Invention

Since the rotary electric machine of the present disclosure includes spacers each having a cavity portion, increase in weight of the low-speed rotor can be suppressed.

DESCRIPTION OF EMBODIMENTS

Figure 1:
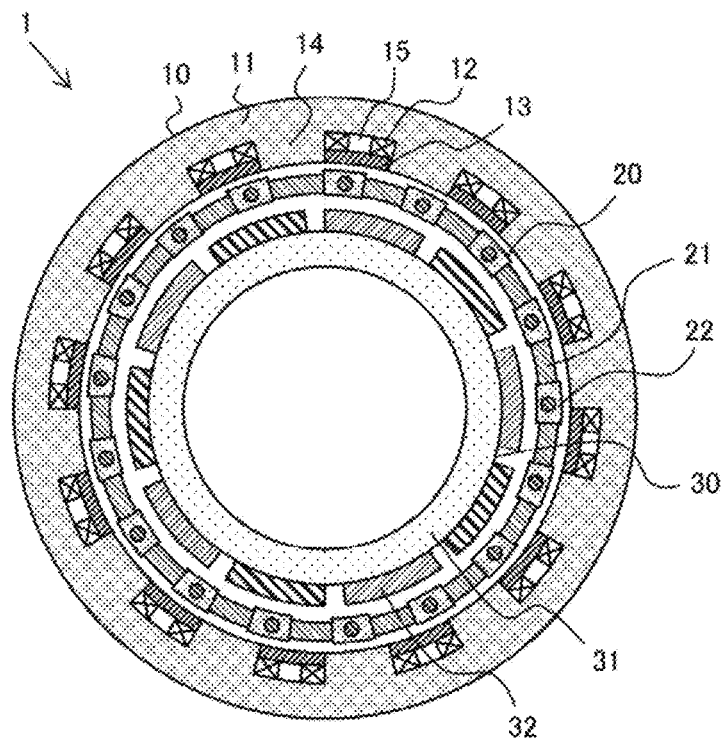
FIG. 1 is a cross-sectional schematic diagram of a rotary electric machine according to embodiment 1.

Hereinafter, a rotary electric machine according to embodiments for carrying out the present disclosure will be described in detail with reference to the drawings. In the drawings, the same or corresponding portions are denoted by the same reference characters.

Embodiment 1

FIG. 1 is a cross-sectional schematic diagram of a rotary electric machine according to embodiment 1. FIG. 1 is a cross-sectional schematic diagram of a face perpendicular to the axial direction of the rotary electric machine. A rotary electric machine 1 of the present embodiment includes: a stator 10; a low-speed rotor 20 provided so as to be rotatable with respect to the stator 10, with a gap from the stator 10; and a high-speed rotor 30 provided coaxially with the low-speed rotor 20, with a gap from the low-speed rotor 20. The stator 10, the low-speed rotor 20, and the high-speed rotor 30 each have a cylindrical shape and are disposed coaxially with each other. The rotary electric machine 1 of the present embodiment is a magnetic-geared electric generator in which the stator 10, the low-speed rotor 20, and the high-speed rotor 30 are disposed in this order from the outer diameter side.

The stator 10 includes a stator core 11 having a cylindrical shape, a stator coil 12, and a stator permanent magnet 13. The stator core 11 has 12 teeth 14 protruding to the inner circumferential side, and 12 slots 15 are formed between the teeth 14. The stator coil 12 and the stator permanent magnet 13 are disposed in each slot 15.

The low-speed rotor 20 having a cylindrical shape includes: a plurality of magnetic pole pieces 21 disposed so as to be arranged in the circumferential direction; and a plurality of spacers 22 made of nonmagnetic metal and respectively disposed between the plurality of magnetic pole pieces 21. 17 magnetic pole pieces 21 and 17 spacers 22 are disposed.

The high-speed rotor 30 includes: a high-speed rotor core 31 having a cylindrical shape; and 10 rotor permanent magnets 32 disposed so as to be arranged in the circumferential direction at the surface on the outer circumferential side of the high-speed rotor core 31. The rotary electric machine 1 of the present embodiment is a so-called magnetic-geared electric generator with 10 poles and 12 slots. The speed increase ratio determined by the number of magnetic pole pieces/the number of pole pairs is 17/5, i.e., 3.4. The high-speed rotor 30 rotates at 3.4 times the rotation speed of the low-speed rotor 20.

The stator permanent magnets 13 are all magnetized so as to have the same polarity in the radial direction. Therefore, when the stator permanent magnets 13 serve as the N pole, the teeth 14 serve as the S pole, and a number of pole pairs Ns, which is the same as the number of slots 15, is realized. The rotor permanent magnets 32 of the high-speed rotor 30 realize a number of pole pairs Nh.

At this time, if $N_L = N_s \pm N_h$ is satisfied, due to interaction of the magnetic force between the stator permanent magnets 13 and the rotor permanent magnets 32, a negative torque is caused in the low-speed rotor 20. When the low-speed rotor 20 is rotated by external motive power, it is possible to obtain an input for the low-speed rotor 20.

If the high-speed rotor 30 is set so as to be rotatable with respect to the input of the low-speed rotor 20, the high-speed rotor 30 is rotated at a rotation speed $N_L/N_h$ times that of the low-speed rotor 20. When the high-speed rotor 30 is rotated at a rotation speed $N_L/N_h$ times that of the low-speed rotor 20, an induced electromotive force can be generated in each stator coil 12, and generated power can be outputted from the stator coil 12.

Figure 2:
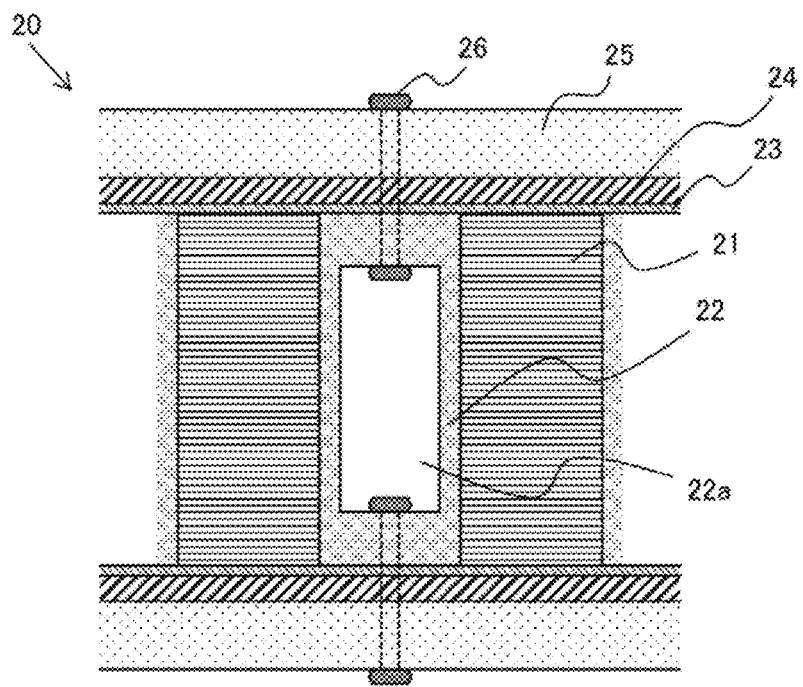
FIG. 2 is a side view of a low-speed rotor according to embodiment 1.

FIG. 2 is a side view of the low-speed rotor 20 of the present embodiment. FIG. 2 is a side view of the rotary electric machine 1 viewed from the inner diameter side. In FIG. 2, the vertical direction is the axial direction of the rotary electric machine 1, and the horizontal direction is the circumferential direction. The low-speed rotor 20 includes: the plurality of magnetic pole pieces 21 disposed so as to be arranged in the circumferential direction; and the spacers 22 made of nonmagnetic metal. One magnetic pole piece 21 is composed of a plurality of thin-plate-shaped electromagnetic steel sheets stacked in the axial direction. At each of end portions in the axial direction of the spacers 22, a clamper 24 having an annular shape is disposed via an electric insulation layer 23 having an annular shape. The electric insulation layer 23 electrically insulates the clamper 24, and the spacers 22 and the magnetic pole pieces 21 from each other. A torque transmission member 25 is disposed on the outer side of the clamper 24.

Each spacer 22 is provided with a cavity portion 22a in a center portion thereof in the axial direction. A fastening tool 26 penetrating the spacer 22, the electric insulation layer 23, the clamper 24, and the torque transmission member 25 from this cavity portion 22a is provided. The fastening tool 26 fastens the spacer 22, and the clamper 24 and the torque transmission member 25. A torque is transmitted from the torque transmission member 25 to the low-speed rotor 20 via the fastening tool 26. The fastening tool 26 is electrically insulated from the spacer 22, the clamper 24, and the torque transmission member 25.

For the electric insulation layer 23, silicone rubber or the like can be used, for example. For the spacer 22, the clamper 24, and the torque transmission member 25, nonmagnetic stainless steel, titanium, aluminum, brass, copper, or the like can be used. For the fastening tool 26, an insulating material such as a ceramic can be used, for example. The fastening tool 26 only has to be electrically insulated from the spacer 22, the clamper 24, and the torque transmission member 25. When a metal member is used as the fastening tool 26, an insulation member having a sheet shape may be inserted at a contact face between the fastening tool 26 and the spacer 22 or the like. For the insulation member having a sheet shape, a film made of silicone rubber can be used, for example. As another method, there is a method in which insulation treatment is performed on the surface of the fastening tool 26 made of metal. As a method in which insulation treatment is performed on the surface of a metal member, a method in which an insulation varnish is applied on the surface of the metal member, a method in which an insulating ceramic or resin is sprayed to the surface of the metal member, or the like can be used, for example.

Figure 3:
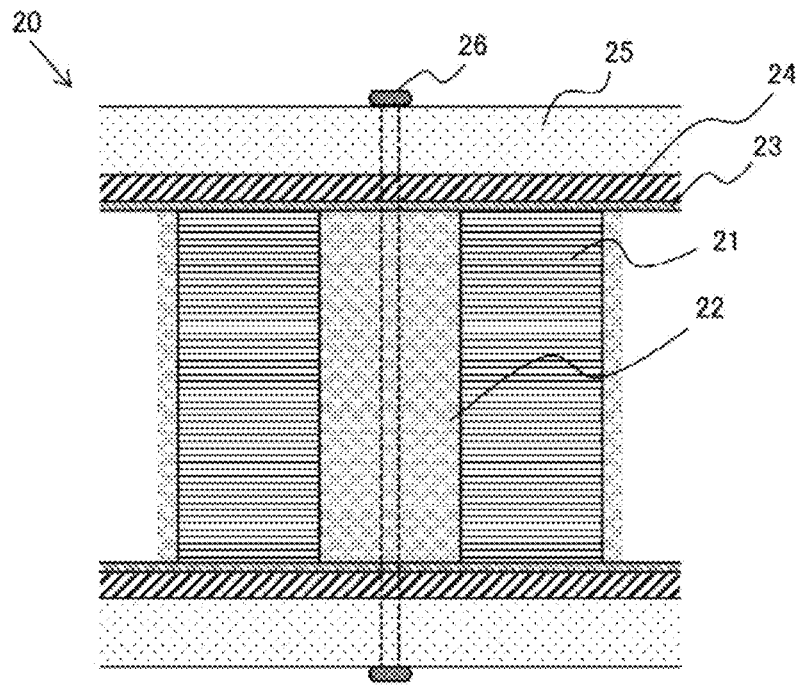
FIG. 3 is a side view of a low-speed rotor of a comparative example according to embodiment 1.

FIG. 3 is a side view of a low-speed rotor 20 of a comparative example of the present embodiment. The low-speed rotor 20 of the comparative example shown in FIG. 3 is not provided with a cavity portion in the spacer 22. The fastening tool 26 fastens the torque transmission members 25 at both end portions in the axial direction. Since the low-speed rotor 20 of the present embodiment is provided with the cavity portion 22a in each spacer 22, the low-speed rotor 20 of the present embodiment is lighter in weight than that of the comparative example.

When the rotary electric machine 1 is rotated, cooling air can be caused to flow through each cavity portion 22a. Therefore, cooling performance for the stator 10 and the high-speed rotor 30, which are disposed with a gap from the low-speed rotor 20, can be improved. In addition, since the surface area of each spacer 22 is expanded, temperature rise of the low-speed rotor 20 itself can be suppressed.

In the rotary electric machine 1 of the present embodiment, each clamper 24 and each torque transmission member 25 are implemented as separate members. However, the clamper 24 may also serve as the torque transmission member 25.

In the rotary electric machine of the present embodiment, the stator 10, the low-speed rotor 20, and the high-speed rotor 30 are provided in this order from the outer diameter side. However, the order is not limited thereto. In addition, the rotary electric machine of the present embodiment is a magnetic-geared electric generator with 10 poles and 12 slots, but is not limited to a magnetic-geared electric generator.

Embodiment 2

Figure 4:
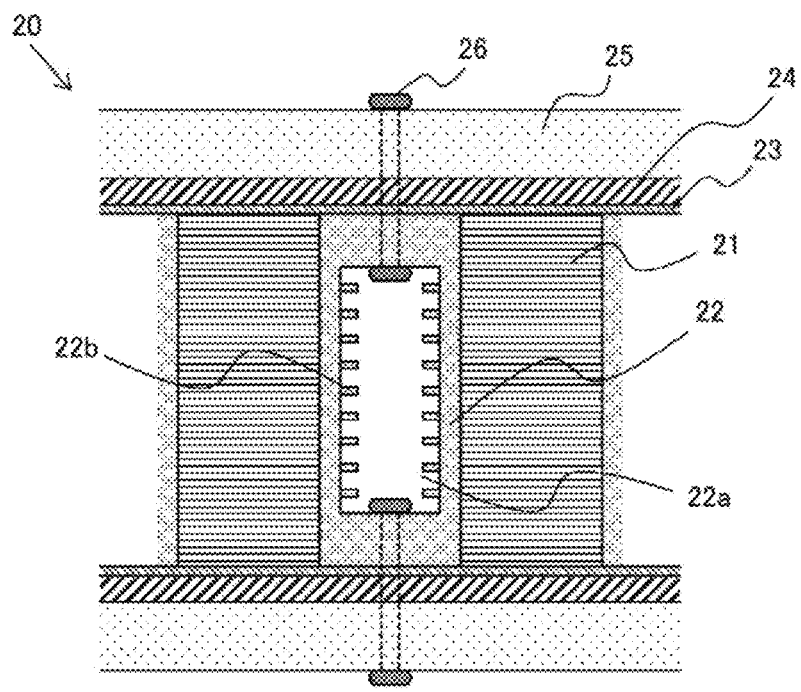
FIG. 4 is a side view of a low-speed rotor according to embodiment 2.

FIG. 4 is a side view of a low-speed rotor of embodiment 2. The low-speed rotor of the present embodiment is obtained by improving cooling characteristics of the spacer in the low-speed rotor described in embodiment 1. As shown in FIG. 4, in the low-speed rotor of the present embodiment, heat dissipation fins 22b are attached to the inner wall of the cavity portion 22a of the spacer 22. This heat dissipation fin 22b can dissipate heat generated due to eddy current flowing in the spacer 22, to the cavity portion. As a result, temperature rise of the spacer 22 can be suppressed, and thus, thermal deformation of the low-speed rotor 20 can be reduced.

Embodiment 3

Figure 5:
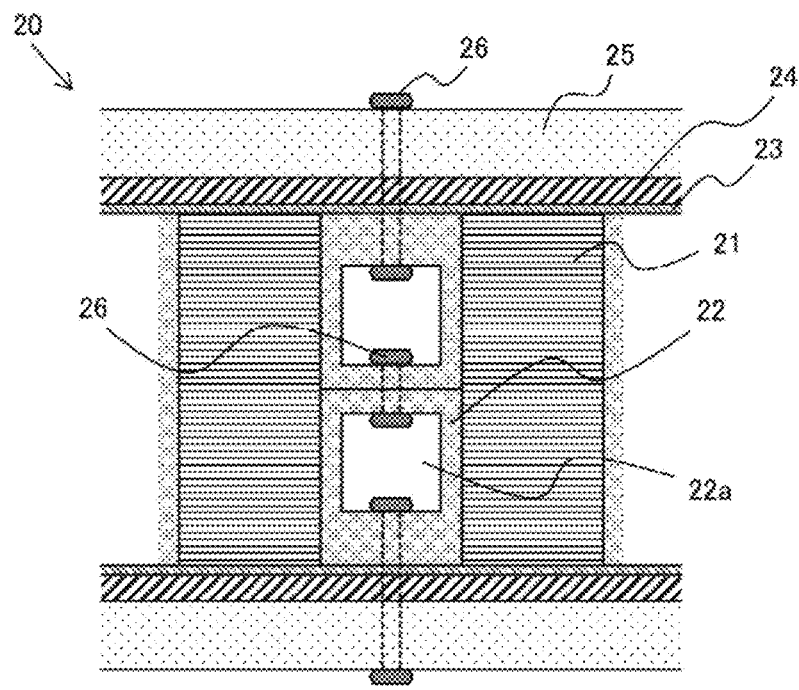
FIG. 5 is a side view of a low-speed rotor according to embodiment 3.

FIG. 5 is a side view of a low-speed rotor of embodiment 3. The low-speed rotor of the present embodiment is obtained by dividing the spacer provided with a cavity portion into a plurality of spacers in the axial direction, in the low-speed rotor described in embodiment 1. As shown in FIG. 5, in the low-speed rotor of the present embodiment, two spacers 22 each provided with the cavity portion 22a are arranged in the axial direction. The two spacers 22 arranged in the axial direction are electrically insulated from each other by an electric insulation layer (not shown). The two spacers 22 are each fastened to the clamper 24 and the torque transmission member 25 by a fastening tool 26. Further, these two spacers 22 are fastened to each other by a fastening tool 26, using the cavity portions 22a. These fastening tools 26 and spacers 22 are electrically insulated from each other.

The low-speed rotor 20 having such a configuration is light in weight because each spacer 22 is provided with the cavity portion 22a. The spacer 22 may be divided into three or more spacers.

In the low-speed rotor 20, eddy current occurs in the spacer 22 due to the interlinkage magnetic flux from the stator 10 and the interlinkage magnetic flux from the high-speed rotor 30. The eddy current decreases efficiency of the rotary electric machine 1. In the low-speed rotor described in embodiment 1, eddy current flows in the form of one large loop so as to circulate in the entirety of the spacer 22. In the low-speed rotor 20 of the present embodiment, the spacer 22 is divided into two spacers 22 arranged in the axial direction, and these two spacers are electrically insulated from each other. Therefore, eddy current occurring in the spacers 22 flows in the form of two small loops so as to circulate in the respective two spacers. When eddy current flows in two small loops, the absolute amount of the current is smaller than when eddy current flows in one large loop. As a result, decrease in efficiency due to eddy current can be suppressed in the rotary electric machine 1 of the present embodiment.

Embodiment 4

The spacer of the low-speed rotor described in each of embodiments 1 to 3 is provided with a cavity portion in a center portion thereof in the axial direction, and thus, has an advantage that the spacer is light in weight when compared with a spacer not provided with a cavity portion. However, in a low-speed rotor that includes a spacer provided with a cavity portion, rigidity may be reduced when compared with a low-speed rotor that includes a spacer not provided with a cavity portion. A low-speed rotor of embodiment 4 can improve rigidity of the low-speed rotor even when a spacer provided with a cavity portion is used.

Figure 6:
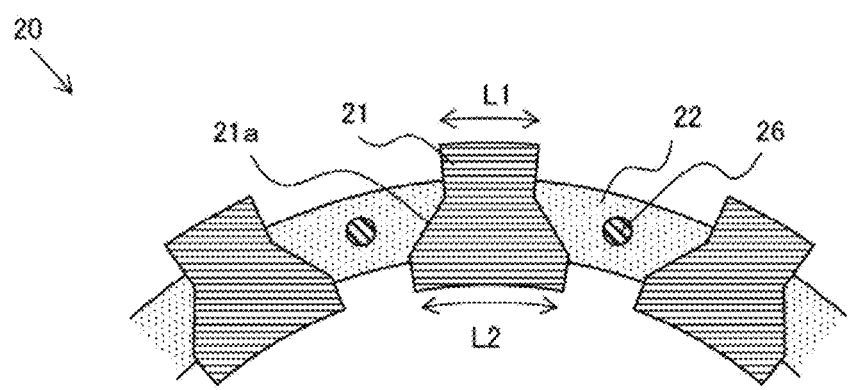
FIG. 6 is a top view of a low-speed rotor according to embodiment 4.

FIG. 6 is a top view of a low-speed rotor of the present embodiment. The electric insulation layer, the clamper, and the torque transmission member are not shown. In FIG. 6, the upper side corresponds to the outer diameter side, and the lower side corresponds to the inner diameter side. That is, in FIG. 6, the upper side of the low-speed rotor corresponds to the gap on the stator side, and the lower side corresponds to the gap on the high-speed rotor side. As shown in FIG. 6, a low-speed rotor 20 of the present embodiment includes: a plurality of magnetic pole pieces 21 each obtained by electromagnetic steel sheets being stacked in the axial direction; and a plurality of spacers 22 made of nonmagnetic metal and respectively disposed between the plurality of magnetic pole pieces 21. Each spacer 22 is the spacer described in embodiment 1, and is provided with a cavity portion in the center portion thereof in the axial direction.

In the present embodiment, in one magnetic pole piece 21, a width L2 in the circumferential direction on the inner diameter side is larger than a width L1 in the circumferential direction on the outer diameter side. At side faces on both sides in the radial direction of one magnetic pole piece 21, oblique surfaces 21a that are oblique with respect to the radial direction are provided. The spacer 22 is disposed in contact with the oblique surfaces 21a. The spacer 22 is fastened to the clamper 24 and the torque transmission member 25 by a fastening tool 26.

When the low-speed rotor 20 is rotated, a centrifugal force is applied to the low-speed rotor 20 from the inner diameter side toward the outer diameter side. In the low-speed rotor 20 of the present embodiment, the centrifugal force applied to the magnetic pole pieces 21 is supported by the spacers 22 via the oblique surfaces 21a. Thus, rigidity of the low-speed rotor 20 can be improved. Forces that act on the magnetic pole pieces include the own weight, the electromagnetic force, and the like in addition to the centrifugal force. These forces can also be supported by the spacers 22 via the oblique surfaces 21a.

Embodiment 5

Figure 7:
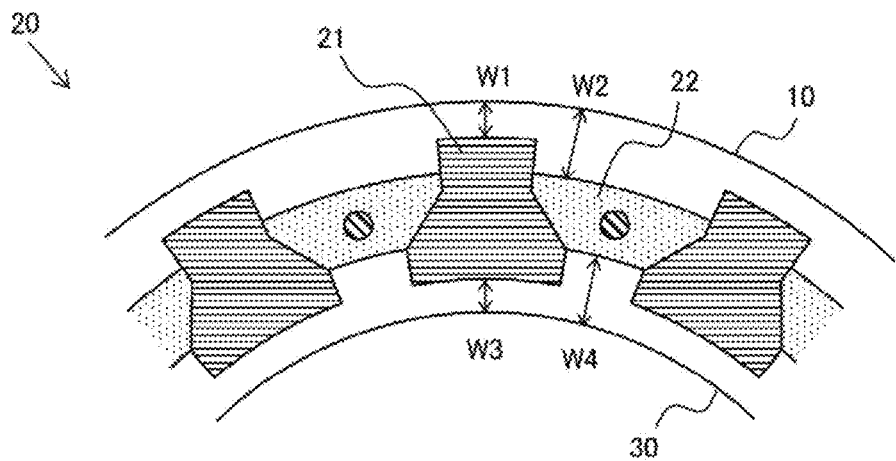
FIG. 7 is a top view of a low-speed rotor according to embodiment 5.

FIG. 7 is a top view of a low-speed rotor of embodiment 5. The electric insulation layer, the clamper, and the torque transmission member are not shown. In FIG. 7, the upper side corresponds to the outer diameter side, and the lower side corresponds to the inner diameter side. The low-speed rotor 20 shown in FIG. 7 has a structure similar to that of the low-speed rotor of embodiment 4. As shown in FIG. 7, in the low-speed rotor 20 of the present embodiment, the length in the radial direction of the magnetic pole piece 21 is set to be larger than the length in the radial direction of the spacer 22. That is, a width W2 of the gap between the spacer 22 and the stator 10 is larger than a width W1 of the gap between the magnetic pole piece 21 and the stator 10. In addition, a width W4 of the gap between the spacer 22 and the high-speed rotor 30 is larger than a width W3 of the gap between the magnetic pole piece 21 and the high-speed rotor 30.

In the spacer 22, eddy current occurs due to the interlinkage magnetic flux from the stator 10 and the interlinkage magnetic flux from the high-speed rotor 30. In order to reduce these interlinkage magnetic fluxes, it is preferable that the width of the gap between the spacer 22 and the stator 10 and the width of the gap between the spacer 22 and the high-speed rotor 30 are made large. However, when the width of the gap between the magnetic pole piece 21 and the stator 10 and the width of the gap between the magnetic pole piece 21 and the high-speed rotor 30 are large, the main magnetic flux of the magnetic pole piece 21 is decreased.

As in the present embodiment, when the width of the gap between the spacer 22, and the stator 10 and the high-speed rotor 30 is made larger than the width of the gap between the magnetic pole piece 21, and the stator 10 and the high-speed rotor 30, eddy current occurring in the spacer 22 can be reduced. As a result, in the low-speed rotor of the present embodiment, loss due to eddy current can be reduced while decrease in the main magnetic flux of the magnetic pole piece 21 is suppressed.

Embodiment 6

Figure 8:
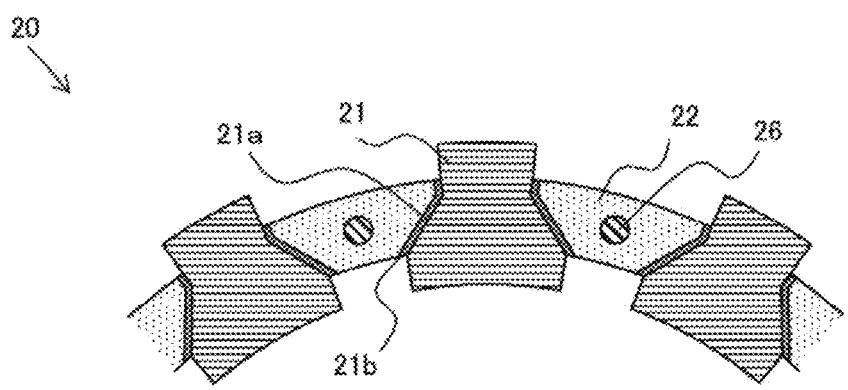
FIG. 8 is a top view of a low-speed rotor according to embodiment 6.

FIG. 8 is a top view of a low-speed rotor of embodiment 6. The electric insulation layer, the clamper, and the torque transmission member are not shown. In FIG. 8, the upper side corresponds to the outer diameter side, and the lower side corresponds to the inner diameter side. The low-speed rotor 20 shown in FIG. 8 has a structure similar to that of the low-speed rotor of embodiment 4. As shown in FIG. 8, in the low-speed rotor 20 of the present embodiment, the magnetic pole piece 21 and the spacer 22 are disposed with an insulation member 21b interposed therebetween. In the low-speed rotor of the present embodiment, through interposition of the insulation member 21b between the magnetic pole piece 21 and the spacer 22, the magnetic pole piece 21 and the spacer 22 are electrically insulated from each other.

As described in embodiment 5, in the spacer 22, eddy current occurs due to the interlinkage magnetic flux from the stator 10 and the interlinkage magnetic flux from the high-speed rotor 30. When the magnetic pole piece 21 and the spacer 22 are electrically connected to each other, a path in which eddy current having occurred in the spacer 22 flows to another spacer 22 via a magnetic pole piece 21 adjacent to this spacer 22 is caused. Such a path of eddy current leads to decrease in efficiency.

In the low-speed rotor of the present embodiment, since the magnetic pole piece 21 and the spacer 22 are electrically insulated from each other, a path in which eddy current flows to another spacer via a magnetic pole piece 21 can be blocked. As a result, decrease in efficiency of the low-speed rotor can be prevented.

Embodiment 7

Figure 9:
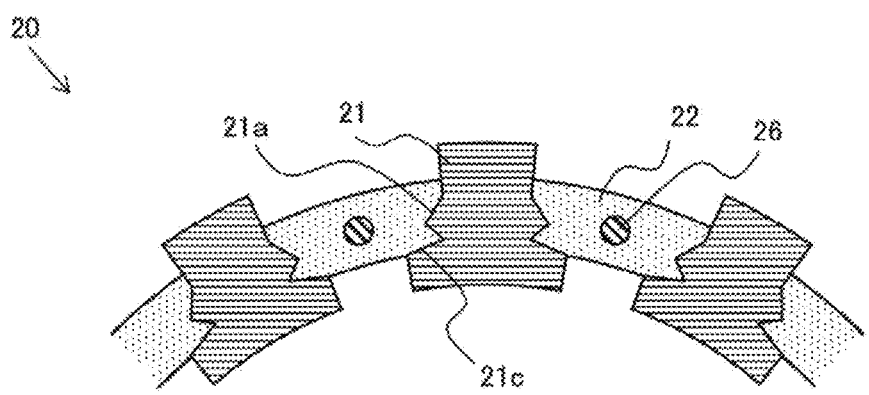
FIG. 9 is a top view of a low-speed rotor according to embodiment 7.

FIG. 9 is a top view of a low-speed rotor of embodiment 7. The electric insulation layer, the clamper, and the torque transmission member are not shown. In FIG. 9, the upper side corresponds to the outer diameter side, and the lower side corresponds to the inner diameter side. The low-speed rotor 20 shown in FIG. 9 has a structure similar to that of the low-speed rotor of embodiment 4. A recess 21c toward the inner side of the magnetic pole piece 21 is provided in a part of each oblique surface 21a of the magnetic pole piece 21. The spacer 22 is disposed in contact with the oblique surfaces 21a and the recesses 21c. The spacer 22 is fastened to the clamper 24 and the torque transmission member 25 by a fastening tool 26.

Since the magnetic pole piece 21 is a magnetic body, an electromagnetic force acts on the magnetic pole piece 21 in addition to a centrifugal force due to rotation. In addition, a force due to the own weight also acts. The centrifugal force acting on the magnetic pole piece 21 acts from the inner circumferential side toward the outer circumferential side, whereas other forces such as the electromagnetic force may act in a direction opposite to that of the centrifugal force. In the structure of the low-speed rotor shown in embodiment 4, the spacer 22 has an effect of supporting the magnetic pole piece 21 against the centrifugal force, but the effect of supporting against a force acting in a direction opposite to that of the centrifugal force is small. In the low-speed rotor 20 of the present embodiment, the spacer 22 is disposed in contact with the oblique surfaces 21a and the recesses 21c of the magnetic pole pieces 21, and thus, even when a force acting in a direction opposite to that of the centrifugal force acts on the magnetic pole pieces 21, the spacer 22 can support the magnetic pole pieces 21. Therefore, rigidity of the low-speed rotor 20 can be improved.

Figure 10:
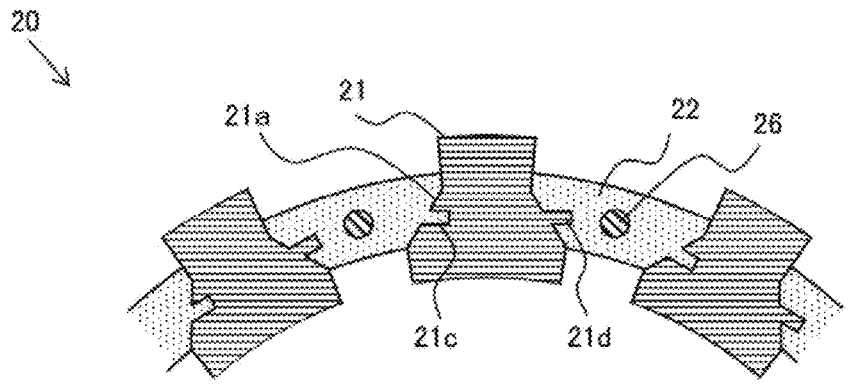
FIG. 10 is a top view of a low-speed rotor according to embodiment 7.

FIG. 10 is a top view of another low-speed rotor of the present embodiment. The electric insulation layer, the clamper, and the torque transmission member are not shown. In FIG. 10, the upper side corresponds to the outer diameter side, and the lower side corresponds to the inner diameter side. The low-speed rotor 20 shown in FIG. 10 has a structure similar to that of the low-speed rotor of embodiment 4. A recess 21c toward the inner side of the magnetic pole piece 21 is provided to one oblique surface 21a of the magnetic pole piece 21, and a protrusion 21d toward the outer side of the magnetic pole piece 21 is provided to the other oblique surface 21a of the magnetic pole piece 21. The spacer 22 is disposed in contact with the oblique surfaces 21a, the recess 21c, and the protrusion 21d. The spacer 22 is fastened to the clamper 24 and the torque transmission member 25 by a fastening tool 26.

In the low-speed rotor 20 having such a configuration as well, the spacer 22 is disposed in contact with the oblique surfaces 21a, the recess 21c, and the protrusion 21d of the magnetic pole pieces 21, and thus, an effect of supporting against a force acting in a direction opposite to that of the centrifugal force can also be obtained. Therefore, rigidity of the low-speed rotor 20 can be improved.

Embodiment 8

Figure 11:
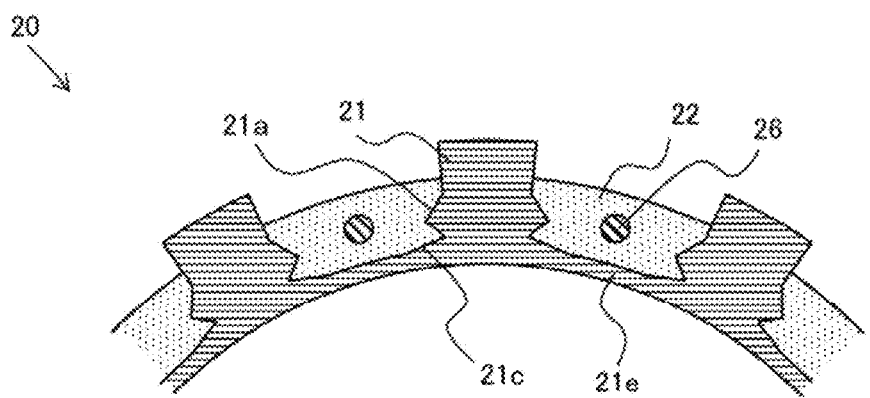
FIG. 11 is a top view of a low-speed rotor according to embodiment 8.

FIG. 11 is a top view of a low-speed rotor of embodiment 8. The electric insulation layer, the clamper, and the torque transmission member are not shown. In FIG. 11, the upper side corresponds to the outer diameter side, and the lower side corresponds to the inner diameter side. The low-speed rotor 20 shown in FIG. 11 has a structure similar to that of the low-speed rotor of embodiment 7. Magnetic pole pieces 21 adjacent to each other are connected by a connection portion 21e on the inner circumferential side of the magnetic pole pieces 21. The spacer 22 is disposed in contact with the oblique surfaces 21a and the recesses 21c, and the connection portion 21e. The spacer 22 is fastened to the clamper 24 and the torque transmission member 25 by a fastening tool 26.

In the low-speed rotor 20 having such a configuration, rigidity is improved. In addition, sparseness and denseness of the magnetic fluxes from the low-speed rotor 20 toward the high-speed rotor 30 can be mitigated, and eddy current loss caused at the high-speed rotor can be reduced.

Figure 12:
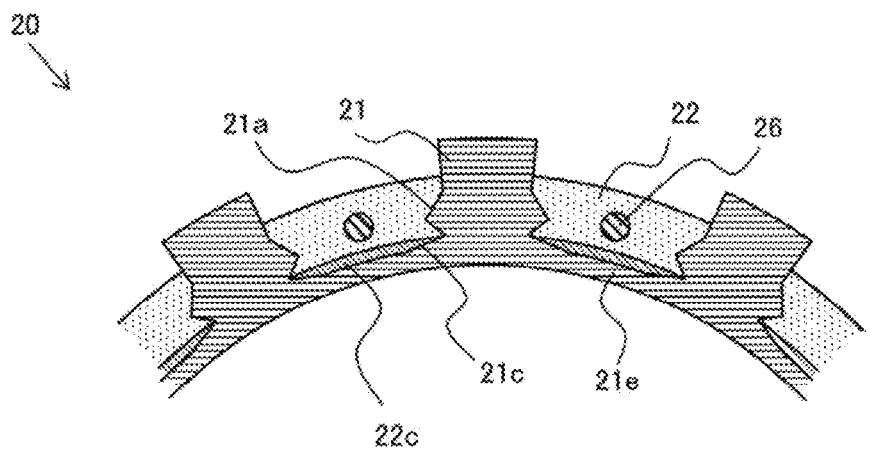
FIG. 12 is a top view of a low-speed rotor according to embodiment 8.

FIG. 12 is a top view of another low-speed rotor of the present embodiment. The electric insulation layer, the clamper, and the torque transmission member are not shown. In FIG. 12, the upper side corresponds to the outer diameter side, and the lower side corresponds to the inner diameter side. The low-speed rotor 20 shown in FIG. 12 has a structure similar to that of the low-speed rotor shown in FIG. 11. A resin 22c is provided between the connection portion 21e of the magnetic pole piece 21 and the spacer 22. The connection portion 21e of the magnetic pole piece 21 and the spacer 22 are fixed by the resin 22c.

The connection portion 21e has a smaller thickness in the radial direction than the other portion of the magnetic pole piece 21. Therefore, the connection portion 21e is more likely to be deformed due to an electromagnetic force, etc., that acts on the connection portion 21e, than the other portion of the magnetic pole piece 21. Since the connection portion 21e of the magnetic pole piece 21 and the spacer 22 are fixed by the resin 22c, deformation of the connection portion 21e can be prevented.

Embodiment 9

Figure 13:
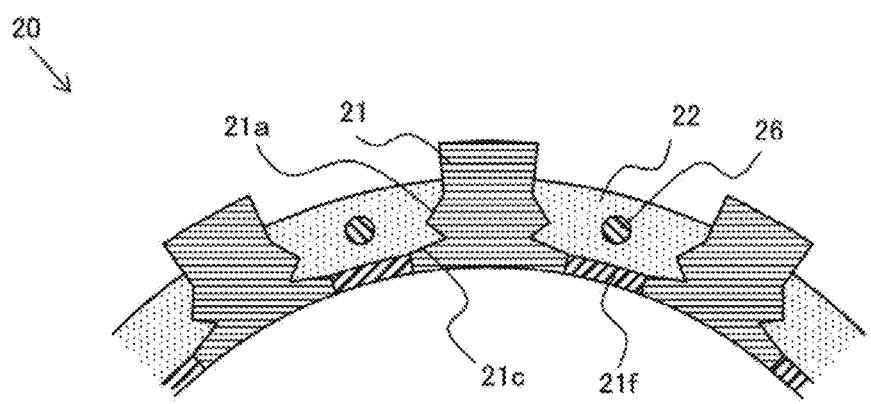
FIG. 13 is a top view of a low-speed rotor according to embodiment 9.

FIG. 13 is a top view of a low-speed rotor of embodiment 9. The electric insulation layer, the clamper, and the torque transmission member are not shown. In FIG. 13, the upper side corresponds to the outer diameter side, and the lower side corresponds to the inner diameter side. The low-speed rotor 20 shown in FIG. 13 has a structure similar to that of the low-speed rotor of embodiment 7. Magnetic pole pieces 21 adjacent to each other are connected by a magnetic connection member 21f on the inner circumferential side of the magnetic pole pieces 21. The magnetic connection member 21f is a member separate from the magnetic pole pieces 21. The spacer 22 is disposed in contact with the oblique surfaces 21a, the recesses 21c, and the magnetic connection member 21f. The spacer 22 is fastened to the clamper 24 and the torque transmission member 25 by a fastening tool 26.

In the low-speed rotor 20 having such a configuration, rigidity is improved as in embodiment 8. In addition, sparseness and denseness of the magnetic fluxes from the low-speed rotor 20 toward the high-speed rotor 30 can be mitigated, and eddy current loss caused at the high-speed rotor can be reduced.

Embodiment 10

Figure 14:
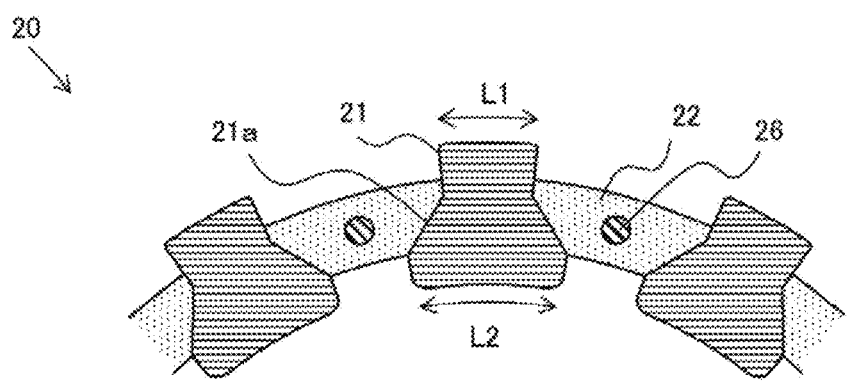
FIG. 14 is a top view of a low-speed rotor according to embodiment 10.

FIG. 14 is a top view of a low-speed rotor of embodiment 10. The electric insulation layer, the clamper, and the torque transmission member are not shown. In FIG. 14, the upper side corresponds to the outer diameter side, and the lower side corresponds to the inner diameter side. The low-speed rotor 20 shown in FIG. 14 has a structure similar to that of the low-speed rotor of embodiment 4. As shown in FIG. 14, corner portions on the inner circumferential side and corner portions on the outer circumferential side of the magnetic pole piece 21 of the low-speed rotor 20 of the present embodiment are rounded. Further, the curvature of each of the corner portions on the inner circumferential side is larger than the curvature of each of the corner portions on the outer circumferential sides.

Magnetic fluxes that pass through the low-speed rotor 20 mainly pass through the magnetic pole pieces 21 being magnetic bodies, and do not pass very much through the spacers 22 being nonmagnetic bodies. Therefore, a distribution of sparseness and denseness of the magnetic fluxes that pass through the low-speed rotor 20 occurs. When magnetic fluxes having a distribution of sparseness and denseness interlink the stator 10 or the high-speed rotor 30, eddy current loss is caused at the stator 10 or the high-speed rotor 30, and efficiency is decreased. In the low-speed rotor 20 of the present embodiment, since the corner portions of the magnetic pole piece 21 are rounded, the distribution of the sparseness and denseness of the magnetic fluxes can be corrected, and thus, eddy current loss at the stator 10 or the high-speed rotor 30 can be reduced.

However, when the corner portions of the magnetic pole piece 21 are rounded, the gap between the magnetic pole piece 21, and the stator 10 or the high-speed rotor 30 is expanded in an equivalent manner. Accordingly, the main magnetic flux of the magnetic pole piece 21 is decreased. In the present embodiment, in one magnetic pole piece 21, the width L2 in the circumferential direction on the inner diameter side is larger than the width L1 in the circumferential direction on the outer diameter side. Therefore, the equivalent gap expansion due to rounding of the corner portions on the outer diameter side has a larger influence than the equivalent gap expansion due to rounding of the corner portions on the inner diameter side. In the low-speed rotor 20 of the present embodiment, the curvature of each of the corner portions on the inner circumferential side is larger than the curvature of each of the corner portions on the outer circumferential side. Therefore, while decrease in the main magnetic flux of the magnetic pole piece 21 is reduced, eddy current loss at the stator 10 or the high-speed rotor 30 can be reduced.

Embodiment 11

Figure 15:
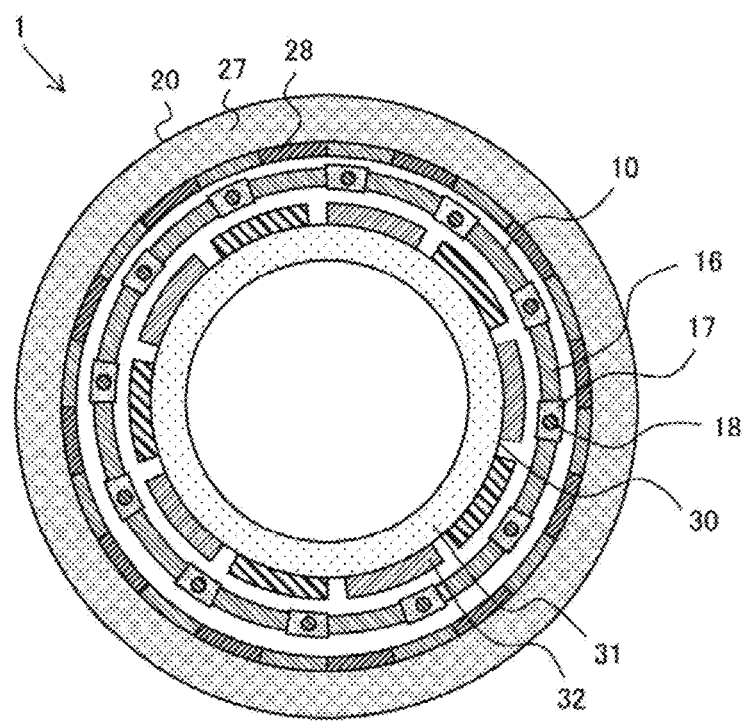
FIG. 15 is a cross-sectional schematic diagram of a rotary electric machine according to embodiment 11.

FIG. 15 is a cross-sectional schematic diagram of a rotary electric machine according to embodiment 11. FIG. 15 is a cross-sectional schematic diagram of a face perpendicular to the axial direction of the rotary electric machine. The rotary electric machine 1 of the present embodiment includes: a stator 10; a low-speed rotor 20 rotatably provided on the outer circumferential side of the stator 10, with a gap from the stator 10; and a high-speed rotor 30 rotatably provided on the inner circumferential side of the stator 10, with a gap from the stator 10. The stator 10, the low-speed rotor 20, and the high-speed rotor 30 each have a cylindrical shape, and are disposed coaxially with each other. In the rotary electric machine 1 of the present embodiment, the low-speed rotor 20, the stator 10, and the high-speed rotor 30 are disposed in this order from the outer diameter side.

The stator 10 includes: a plurality of stator magnetic pole pieces 16 disposed so as to be arranged in the circumferential direction; and a plurality of stator spacers 17 made of nonmagnetic metal and respectively disposed between the plurality of stator magnetic pole pieces 16. One stator magnetic pole piece 16 is composed of a plurality of thin-plate-shaped electromagnetic steel sheets stacked in the axial direction. Similar to the spacer described in embodiment 1, each stator spacer 17 is provided with a cavity portion in a center portion thereof in the axial direction. A clamper having an annular shape is disposed at each of end portions in the axial direction of the stator spacer 17. The stator spacer 17 and the clamper are fastened to each other by a fastening tool 18. The fastening tool 18 is electrically insulated from the stator spacer 17 and the clamper.

The low-speed rotor 20 is composed of a low-speed rotor core 27 having a cylindrical shape; and low-speed rotor permanent magnets 28 attached on the inner circumferential side of the low-speed rotor core 27.

The high-speed rotor 30 includes a high-speed rotor core 31 having a cylindrical shape; and rotor permanent magnets 32 disposed so as to be arranged in the circumferential direction at the surface on the outer circumferential side of the high-speed rotor core 31.

Since the rotary electric machine 1 of the present embodiment is provided with a cavity portion in each stator spacer 17, the rotary electric machine 1 of the present embodiment is lighter in weight than a rotary electric machine that uses a stator spacer not provided with a cavity portion.

Although the present disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the present disclosure. It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 rotary electric machine
10 stator
11 stator core
12 stator coil
13 stator permanent magnet
14 teeth
15 slot
16 stator magnetic pole piece
17 stator spacer
18 fastening tool
20 low-speed rotor
21 magnetic pole piece
21a oblique surface
21b insulation member
21c recess
21d protrusion
21e connection portion
21f magnetic connection member
22 spacer
22a cavity portion
22b heat dissipation fin
22c resin
23 electric insulation layer
24 clamper
25 torque transmission member
26 fastening tool
27 low-speed rotor core
28 low-speed rotor permanent magnet
30 high-speed rotor
31 high-speed rotor core
32 rotor permanent magnet

The invention claimed is:

1. A rotary electric machine comprising:
a stator including a stator coil and a stator permanent magnet;
a first rotor provided so as to be rotatable with respect to the stator, with a first gap from the stator; and
a second rotor provided coaxially with the first rotor, with a second gap from the first rotor, the second rotor including a plurality of rotor permanent magnets disposed so as to be arranged in a circumferential direction, wherein
the first rotor includes
a plurality of magnetic pole pieces disposed so as to be arranged in the circumferential direction,
a plurality of spacers made of nonmagnetic metal and respectively disposed between the plurality of magnetic pole pieces,
two clampers respectively disposed at both end portions in an axial direction,
an electric insulation layer; and
a plurality of fastening tools, each fastening tool fastening a respective one of the plurality of spacers to a corresponding one of the clampers, the spacer has a cavity portion, and
the electric insulation layer is provided between each spacer and the respective fastening tool in the axial direction, the electric insulation layer electrically insulating the two clampers, the plurality of spacers and the plurality of magnetic pole pieces from each other.

2. The rotary electric machine according to claim 1, wherein each spacer has a plurality of heat dissipation fins at an inner wall of the cavity portion.

3. The rotary electric machine according to claim 1, wherein
each spacer is divided into a plurality of spacers in the axial direction, and the divided spacers are electrically insulated from each other.

4. The rotary electric machine according to claim 1, wherein
in each magnetic pole piece, a width in the circumferential direction on an inner diameter side is larger than a width in the circumferential direction on an outer diameter side, and side faces on both sides in the radial direction are each provided with an oblique surface that is oblique with respect to the radial direction.

5. The rotary electric machine according to claim 4, wherein in each magnetic pole piece, the oblique surface is provided with a recess toward an inner side of the magnetic pole piece or a protrusion toward an outer side of the magnetic pole piece.

6. The rotary electric machine according to claim 1, wherein
a width of the first gap between each spacer and the stator is larger than a width of the first gap between each magnetic pole piece and the stator, or a width of the second gap between each spacer and the second rotor is larger than a width of the second gap between each magnetic pole piece and the second rotor.

7. The rotary electric machine according to claim 1, wherein
each magnetic pole piece and a corresponding one of the spacers are in contact with each other via the electric insulation layer.

8. The rotary electric machine according to claim 1, wherein
the plurality of magnetic pole pieces disposed so as to be arranged in the circumferential direction are each connected in the circumferential direction by a connection portion.

9. The rotary electric machine according to claim 1, wherein
the plurality of magnetic pole pieces disposed so as to be arranged in the circumferential direction are each connected in the circumferential direction by a magnetic connection member.

10. The rotary electric machine according to claim 1, wherein
in each magnetic pole piece, a curvature of each of corner portions on an inner circumferential side is larger than a curvature of each of corner portions on an outer circumferential side.

11. The rotary electric machine according to claim 1, wherein each spacer extends between two adjacent magnetic pole pieces among the plurality of magnetic pole pieces, and
the two adjacent magnetic pole pieces being adjacent to one another in the circumferential direction.

12. The rotary electric machine according to claim 11, wherein the cavity of each spacer is provided at a center portion of the spacer in the axial direction.

13. The rotary electric machine according to claim 12, wherein each fastening tool extends between the cavity of the respective spacer and the corresponding one of the clampers.

* * * * *